2,912,431
Patented Nov. 10, 1959

2,912,431

PREPARATION OF CARBOXYALKYL CELLULOSE DERIVATIVES

Richard A. Leonard, Wilmington, Del., and George A. Reasor, Kalamazoo, Mich., assignors to Hercules Powder Company, Wilmington, Del., a corporation of Delaware No Drawing. Application October 1, 1956
Serial No. 612,941

13 Claims. (Cl. 260—232)

This invention relates to a process of bleaching, reducing the viscosity, and densifying carboxyalkyl cellulose derivatives, particularly sodium carboxymethylcellulose, in a single operation.

While this invention is applicable to any water-soluble carboxyalkyl cellulose derivative, as will be set forth more fully hereinafter, it will be described for the most part herein with reference to sodium carboxymethylcellulose for clarity and simplicity and also because sodium carboxymethylcellulose is one of the most important and sufficiently representative of such ethers.

Sodium carboxymethylcellulose and the like are readily prepared by an etherification reaction between cellulose fibers, sodium hydroxide and a carboxylating agent in the presence of an aqueous alcohol. The resulting crude carboxymethylcellulose may either be neutralized and dried directly, or it may be neutralized and washed free of by-products with a suitable aqueous alcohol and then dried. The dried material may be used as is or it may be comminuted and/or screened to any desired particle size.

Viscosity, color and density are all important properties of cellulose derivatives and have a direct bearing on their utility. Heretofore, various means have been employed to regulate and obtain the desired viscosity, color and densification of cellulose derivatives but, insofar as known, all such means have involved a plurality of operations in order to obtain these properties to the desired extent. Too, in the art processes usually it is the cellulose instead of the cellulose derivative in which the viscosity reduction and bleaching are performed.

According to the present invention the desired viscosity reduction, bleaching and densification of carboxyalkyl cellulose derivatives are accomplished in a single operation. Broadly, the invention comprises carrying out a process of bleaching, reducing the viscosity, and densifying carboxyalkyl cellulose derivatives in a single operation which comprises agitating a loose fibrous mass including a water-soluble carboxyalkyl cellulose derivative moist with an aqueous alcohol and containing water and alcohol in such proportions that the mass would normally dry to a loose fibrous product, introducing to the mass during agitation a bleaching-viscosity reducing agent selected from the group consisting of hypohalites, peroxides and periodates, introducing to the mass during agitation a dispersed stream of aqueous fluid as a densifying agent until the amount of water present is at least sufficient to cause incipient gelation at the surface of the individual fibers, maintaining the total liquid content in the mass below about four parts by weight based on the dry weight of the carboxyalkyl cellulose derivative, and substantially drying the resulting mass. More specifically, the densification portion may be carried out such that the amount of water present is sufficient to cause incipient gelation at the surface of the individual cellulose fibers but insufficient to cause destruction of the fibrous structure of the mass of cellulose material being processed (U.S. Patent 2,607,772 to C. H. Rigby), or such that the amount of water present is sufficient to cause destruction of the fibrous structure of the mass (U.S. Patent 2,715,124 to H. C. Miller). After densification, the product may be screened and/or comminuted to any desired particle size, e.g., according to the copending application of H. C. Miller, Serial No. 478,932, now U.S. Patent 2,839,526. In practicing the present invention it is preferred to effect the densification substantially in accordance with the H. C. Miller Patent 2,715,124, as will be amplified hereinafter. It is to be understood that the hypohalites, peroxides and periodates, referred to herein as bleaching agents and sometimes as bleaching-viscosity reducing agents, serve the dual function of bleaching and reducing the viscosity of the carboxyalkyl cellulose derivatives, and that the dispersed stream of aqueous fluid serves to densify the carboxyalkyl cellulose derivatives. The bleaching agent and dispersed stream of aqueous fluid may be added to the mass simultaneously or consecutively.

The following examples illustrate various specific embodiments of the present invention, but these are not to be construed as limitations of the invention. In the examples and elsewhere herein percent and parts are by weight unless otherwise indicated.

EXAMPLES 1–9

In the following examples a crude fibrous sodium carboxymethylcellulose having a carboxymethyl substitution of approximately 0.7 was prepared in accordance with the procedure set forth in U.S. Patent 2,517,577 employing a purified fibrous wool pulp, 50% aqueous caustic soda, aqueous isopropanol containing approximately 87% isopropanol and 13% water, and anhydrous monochloroacetic acid to form the cellulose ether. The crude ether of crude carboxymethylcellulose on a dry weight basis. The crude carboxymethylcellulose was charged to a mixer. Then water and sodium hypochlorite solution containing approximately 6% available chlorine was sprayed onto the mass while agitating, requiring about 3 minutes. Agitation was continued until the fibrous structure of the mass was substantially destroyed and the sodium carboxymethylcellulose was substantially converted into separate, discrete gel particles, requiring about 5 additional minutes. Agitation was discontinued while the mass was still substantially in the form of separate, discrete gel particles and before the gels coalesced into a dough. The gels were discharged from the mixer into a large volume of 85% methanol, calculated to be sufficient to reduce the aqueous content of the total liquid to about 25%. This caused the gels to dehydrate and shrink. The gels were again centrifuged and dried at about 70° C. to a volatile content of about 5%. The product was a free-flowing granular powder of desirably low viscosity and good color.

Detailed conditions of preparation and of the results obtained are presented in Table I below:

Table I

| Example No. | Total Volatiles of Centrifuged NaCMC, Percent | Ratios | | Bleaching Time, sec. | 2% Solution, 25° C. | | | NaCMC Bulk Density, g./cc. |
|---|---|---|---|---|---|---|---|---|
| | | Available Cl₂/ NaCMC | Densification Water/ NaCMC | | Unbleached | Bleached | | |
| | | | | | Visc., cps. | Visc., cps. | Color | |
| 1 | 39.0 | 0.020 | 1.6 | 90 | 5,200 | 460 | 1.0 | 0.68 |
| 1-A | 38.4 | 0.022 | 1.8 | 90 | 3,500 | 385 | 1.0 | 0.68 |
| 2 | 43.8 | 0.019 | 1.3 | 65 | 7,200 | 1,250 | 1.0 | 0.57 |
| 3 | 44.7 | 0.019 | 0.8 | 65 | 5,200 | 458 | 1.0 | 0.57 |
| 4 | 41.1 | 0.017 | 1.5 | 90 | 6,360 | 185 | 1.0 | 0.59 |
| 5 | 41.5 | 0.018 | 1.6 | 90 | 6,200 | 245 | 1.0 | 0.59 |
| 6 | 36.8 | 0.029 | 2.1 | 90 | 5,800 | 41 | 1.0 | 0.64 |
| 7 | 36.5 | 0.031 | 2.3 | 90 | 5,800 | 63 | 1.0 | 0.64 |
| 8 | | 0.014 | 1.9 | 45 | 4,400 | 236 | 1.0 | |
| 9 | | 0.014 | 1.9 | 45 | 5,300 | 342 | 1.0 | |

EXAMPLES 10-13

In order to compare other bleaching agents with sodium hypochlorite, four runs were made, one with potassium periodate, another with hydrogen peroxide, one with sodium hypochlorite as a control and one without a bleaching agent as a blank. These were carried out in substantially the same way as described for Examples 1-9 above. Detail conditions and results are given in Table II below. These data show that while potassium periodate and hydrogen peroxide are not as effective bleaching agents as sodium hypochlorite, they are quite satisfactory for the purposes of the present invention.

Table II

| Example No. | Total Volatiles of Centrifuged NaCMC, Percent | Bleaching Agent | Ratios | | Bleaching Time, sec. | 2% Solution, 25° C. | | NaCMC Bulk Density, g./cc. |
|---|---|---|---|---|---|---|---|---|
| | | | Available Bleach/ NaCMC | Densification Water/ NaCMC | | Visc., cps. | Color | |
| 10 | 38.0 | None | | 1.8 | None | ² 7,900 | ² 2.0 | 0.32 |
| 11 | 38.0 | NaOCl | ¹ 0.04 | 1.8 | 300 | ³ 56 | ³ 1.0 | 0.50 |
| 12 | 38.0 | KIO₄ | 0.04 | 1.8 | 300 | ³ 600 | ³ 1.0 | 0.47 |
| 13 | 38.0 | H₂O₂ | 0.04 | 1.8 | 300 | ³ 110 | ³ 1.5 | 0.60 |

¹ As Cl₂.
² Unbleached.
³ Bleached.

Two important variables which affect the viscosity reduction are bleaching time and the bleach concentration or ratio of bleach to cellulose ether. Bleaching time is the time between when the bleach is applied to the carboxymethylcellulose until the latter is reslurried in methanol. Bleaching time and bleach concentration vary inversely, i.e. within reasonable limitations increased bleaching time may be substituted for decreased bleach concentration and conversely. Preferably the bleaching time will be 30 seconds to 5 minutes, although a bleaching time of 10 seconds to 10 minutes gives good results. While the preferred bleach concentration is about 0.003–0.04 part available chlorine per part cellulose either being treated, higher concentrations may be used as long as the total amount of water in the mass does not exceed the amount required for good densification, as set forth hereinafter. Elevated temperatures enhance bleaching efficiency and rate, but for practical reasons the preferred temperature is about 40° C.–80° C.; however, temperatures on both sides of this range are operable. Of course, the bleaching conditions employed will also depend on the degree of viscosity reduction and color desired.

Suitable bleaching agents include the hypohalites, such as the alkali metal hypobromites, hypochlorites and hypoiodites; peroxides, such as hydrogen peroxide and the alkali metal peroxides; and periodates, such as the alkali metal periodates. The hypochlorites, which are preferred for this invention, are generally the inorganic hypochlorites. Metal hypochlorites, such as the alkali metal and alkaline earth metal hypochlorites, are ordinarily used, but other inorganic hypochlorites such as ammonium hypochlorite, can be used if desired. The preferred hypochlorite is sodium hypochlorite primarily because of its commercial availability. The amount of hypochlorite that is used depends on the desired viscosity of the final product and the bleaching time to be used, and this amount can be expressed in terms of the available chlorine content of the bleaching agent. The amount of hypochlorite that is used normally will be sufficient to provide about 0.1%–6% available chlorine based upon the cellulose employed.

This invention is applicable to any fibrous water-soluble carboxyalkyl cellulose derivative, e.g., any of the alkali metal or ammonium salts of carboxymethyl-, carboxyethyl-, carboxypropyl-, carboxymethyl hydroxyethyl-, carboxyethyl hydroxyethyl celluloses, and the like. The cellulose ether may be in the form of the crude product still containing by-product salts such as sodium chloride and sodium glycolate, partially purified, or substantially completely purified by the removal of such by-product salts.

Of course, other cellulose materials besides purified wood pulp may be employed. Cotton linters or a mixture of cotton linters and wood pulp and various other cellulose materials are suitable.

At least about 67.5% by weight of water in the alcohol is necessary in order for the aqueous alcohol to be a sufficient solvent to destroy the fibrous structure of the cellulose ether. This produces a free-flowing granular powder substantially free of fibrous character. Below about 67.5% by weight of water in the alcohol gives a solvent which is sufficient to cause incipient gelation on the surface of the individual fibers but insufficient to destroy the fibrous structure of the cellulose ether. Employing an aqueous alcohol containing less than about 67.5% by weight of water produces a coarse, fibrous product. While this fibrous product is useful the non-fibrous product is more desirable for most uses. Therefore, it is preferred to operate this invention employing an aqueous alcohol solvent containing at least about 67.5% water. Also, preferably, the total liquid content of the mass will be maintained below the amount which would dissolve the cellulose ether and form a solution. For example, when using an aqueous alcohol having at least about 67.5% water the total liquid content should be held below about 4 parts by weight of the mass.

Suitable water-miscible alcohols include methanol, ethanol, propanol, isopropanol, butanol, and the like.

There are many advantages of this invention as compared with conventional processes. Viscosity reduction and bleaching according to this invention are performed on the cellulose ether instead of the cellulose or alkali cellulose, thus making it possible to remove color produced during etherification. Increased bleaching efficiency is realized because the bleaching and viscosity reduction are carried out on material of high solids content. Another very important advantage realized by emplying the process of the present invention results from the fact that a processing step is eliminated by virtue of effecting bleaching and viscosity reduction simultaneously with densification.

Other modifications within the scope of this invention as defined in the appended claims will be apparent to those skilled in the art.

What we claim and desire to protect by Letters Patent is:

1. A process of bleaching, reducing the viscosity, and densifying lower carboxyalkyl cellulose derivatives in a single operation which comprises agitating a loose fibrous mass including a water-soluble lower carboxyalkyl cellulose derivative moist with an aqueous alkanol and containing water and alkanol in such proportions that the mass would normally dry to a loose fibrous product, introducing to the mass during agitation a bleaching-viscosity reducing agent selected from the group consisting of alkali metal, alkaline earth and ammonium hypohalites, peroxides and periodates, introducing to the mass during agitation a dispersed stream of aqueous fluid as a densifying agent until the amount of water present is at least sufficient to cause incipient gelation at the surface of the individual fibers, maintaining the total liquid content in the mass below about 4 parts by weight based on the dry weight of the carboxyalkyl cellulose derivative, and substantilly drying the resulting mass.

2. A process of bleaching, reducing the viscosity, and densifying lower carboxyalkyl cellulose derivatives in a single operation which comprises agitating a loose fibrous mass including a water-soluble lower carboxyalkyl cellulose derivative moist with an aqueous alkanol and containing water and alkanol in such proportions that the mass would normally dry to a loose fibrous product, introducing to the mass during agitation a bleaching-viscosity reducing agent selected from the group consisting of alkali metal, alkaline earth and ammonium hypohalites, peroxides and periodates, introducing to the mass during agitation a dispersed stream of aqueous fluid as a densifying agent until the amount of water present is at least sufficient to cause incipient gelation at the surface of the individual fibers but insufficient to destroy the loose fibrous structure of the mass, maintaining the total liquid content in the mass below about 4 parts by weight based on the dry weight of the carboxyalkyl cellulose derivative, substantially drying the resulting mass, and mechanically comminuting the dried mass.

3. The process of claim 2 wherein the carboxyalkyl cellulose derivative is sodium carboxymethylcellulose and the bleaching-viscosity reducing agent is sodium hypochlorite.

4. A process of bleaching, reducing the viscosity, and densifying fibrous lower carboxyalkyl cellulose derivatives into free-flowing substantially granular powder in a single operation which comprises agitating a water-soluble lower carboxyalkyl cellulose derivative moist with an aqueous alkanol and containing water and alkanol in such proportions that the mass would normally dry to a loose fibrous product, introducing to the mass during agitation a bleaching-viscosity reducing agent selected from the group consisting of alkali metal, alkaline earth and ammonium hypohalites, peroxides, and periodates, introducing to the mass during agitation a dispersed stream of aqueous fluid as a densifying agent until the amount of water present is sufficient to cause destruction of the fibers, maintaining the total liquid content in the mass below about 4 parts by weight based on the dry weight of the carboxyalkyl cellulose derivative, discontinuing agitation when the fibrous structure of the mass is substantially destroyed and before the separate, discrete gelled particles thus formed coalesce into doughy masses, and substantially drying the gels.

5. The process of claim 4 wherein the bleaching-viscosity reducing agent is admixed with the aqueous fluid densifying agent and the resulting mixture is introduced to the mass during agitation.

6. The process of claim 4 wherein the bleaching-viscosity reducing agent and the aqueous fluid densifying agent are introduced to the mass separately and simultaneously during agiation.

7. The process of claim 4 wherein the bleaching-viscosity reducing agent is a hypohalite.

8. The process of claim 4 wherein the bleaching-viscosity reducing agent is an alkali metal hypohalite.

9. The process of claim 4 wherein the bleaching-viscosity reducing agent is sodium hypohalite.

10. The process of claim 4 wherein the bleaching-viscosity reducing agent is a peroxide.

11. The process of claim 4 wherein the bleaching-viscosity reducing agent is a periodate.

12. A process of bleaching, reducing the viscosity, and densifying fibrous lower carboxyalkyl cellulose derivatives into free-flowing substantially granular powder, quickly soluble in water and substantially dust free, in a single operation which comprises agitating a water-soluble lower carboxyalkyl cellulose derivative moist with an aqueous alkanol and containing water and alkanol in such proportions that the mass would normally dry to a loose fibrous product, introducing to the mass during agitation a bleaching-viscosity reducing agent selected from the group consisting of alkali metal, alkaline earth and ammonium hypohalites, peroxides, and periodates, introducing to the mass during agitation a dispersed stream of aqueous fluid as a densifying agent until the amount of water present is sufficient to cause destruction of the fibers, maintaining the total liquid content in the mass below about 4 parts by weight based on the dry weight of the carboxyalkyl cellulose derivative, discontinuing agitation when the fibrous structure of the mass is substantially destroyed and before the separate, discrete gelled particles thus formed coalesce into doughy masses, substantially drying the gels, and classifying the dried gelled particles to obtain substantially 100% through a U.S. Standard Series Sieve No. 12 with not more than about 20% through a U.S. Standard Series Sieve No. 100.

13. The process of claim 12 wherein the carboxyalkyl cellulose derivative is sodium carboxymethylcellulose.

References Cited in the file of this patent

UNITED STATES PATENTS

| | | |
|---|---|---|
| 2,138,757 | Collings et al. | Nov. 29, 1938 |
| 2,555,446 | Hutchinson | June 5, 1951 |
| 2,662,884 | Jenkins | Dec. 15, 1953 |
| 2,715,124 | Miller | Aug. 9, 1955 |

FOREIGN PATENTS

| | | |
|---|---|---|
| 561,834 | Great Britain | June 7, 1944 |

UNITED STATES PATENT OFFICE
CERTIFICATE OF CORRECTION

Patent No. 2,912,431

November 10, 1959

Richard A. Leonard et al.

It is hereby certified that error appears in the printed specification of the above numbered patent requiring correction and that the said Letters Patent should read as corrected below.

Column 2, line 37, for "wool pulp" read -- wood pulp --; line 39, after "monochloro-" read -- acetic acid to form the cellulose ether. The crude ether --; line 46, strike out "acetic acid to form the cellulose ether. The crude ether"; column 3, line 59, for "either" read -- ether --; column 5, lines 17 and 18, for "emplying" read -- employing --; line 19, for "virture" read -- virtue --; line 44, for "substantilly" read -- substantially --.

Signed and sealed this 3rd day of May 1960.

(SEAL)
Attest:

KARL H. AXLINE
Attesting Officer

ROBERT C. WATSON
Commissioner of Patents